Dec. 10, 1968     P. HUSSMANN     3,415,665
PROCESS OF DEHYDRATING FOOD AND HEAT-SENSITIVE PRODUCTS
Filed Dec. 6, 1965     3 Sheets-Sheet 1

INVENTOR.
PETER HUSSMANN
BY Gerald J. Weiser
ATTORNEY

INVENTOR.
PETER HUSSMANN
ATTORNEY

United States Patent Office 3,415,665
Patented Dec. 10, 1968

3,415,665
PROCES OF DEHYDRATING FOOD AND
HEAT-SENSITIVE PRODUCTS
Peter Hussmann, Florence, Italy, assignor, by mesne assignments, to Uta-Patentverwaltungsgesellschaft m.b.H., Munich, Germany
Continuation-in-part of applications Ser. No. 735,299, May 14, 1958; Ser. No. 785,795, Jan. 9, 1959; Ser. No. 87,808, Feb. 2, 1961. This application Dec. 6, 1965, Ser. No. 511,650
19 Claims. (Cl. 99—199)

ABSTRACT OF THE DISCLOSURE

A process for dehydrating a heat-sensitive food material in a drying zone by contacting droplets of the material to be dehydrated first with a drying gas which has a high relative humidity, retarding initial evaporation of the droplets upon their contact with the gas, thereby maintaining them in their unexploded condition, gradually dehydrating the unexploded droplets by contacting them with an initially dehumidified, drying gas of moderate temperature while feeding the gas upwardly in the drying zone, and separating the dehydrated product; a powdery heat sensitive product, such as a food which is typified by being porous through crevices open to the exterior, wrinkled and shriveled, the product being free of water holes throughout its particle shell and throughout its body and being free of a outer, surrounding crust.

---

The present application is a continuation-in-part of application Ser. No. 735,299, filed May 14, 1958, and entitled "Dehydration Process and Apparatus Therefor," Ser. No. 785, 795, filed Jan. 9, 1959, and entitled, "Process of Producing Dehydrated Edible Fat Preparations of Excellent Storability and Products," and copending application Ser. No. 87,808, entitled, "Dehydration Process, Products Obtained Thereby, and Apparatus for Carrying Out Said Process," now abandoned.

This invention concerns a new method and its various embodiments for making new products from heat-sensitive materials, such as heat-sensitive edible products. The invention concerns new food products. The invention further concerns an apparatus suited for carrying out the process of the invention.

This invention more specifically relates to a dehydration process for removing water by evaporation from liquid-carrying solids in solution or suspension, and more particularly to a novel method of producing stable dehydrated, reconstitutable food products intended for human consumption and dehydrated delicate chemicals, and to products produced thereby.

The invention is especially applicable to the evaporation of water from heat-sensitive materials, particularly food substances, and to the preparation of dried products which may be reconstituted by subsequently mixing them with water, with the preservation in such products of those qualities in the dehydrated product which, when the product is reconstituted, exhibit the flavor and aroma and color of the original material. Although especially useful in the preparation of food products, the invention is also applicable for the processing of various heat-sensitive substances, especially organic substances, chemical and biochemical substances, plasma, serum, yeasts, etc.

The invention provides a new product characterized by a combination of unique and advantageous properties. The product shows remarkably rapid solubilization or dispersion in liquids, splendid retention of the desirable properties such as aroma, flavor, nutrients originally present in the material and excellent storage stability. The product is characterized by unique physical characteristics described further hereinafter. The invention further provides a novel process for making these products which is unexpected departure and contrary to conventional processes prevailing in the field of treatment of heat-sensitive materials. In numerous of its essential aspects, the process of the invention goes against the principles and methods taught by the prior art. The process of the invention, as described further below, calls for a number of interrelated conditions which all interact to bring about certain products, which are not only dehydrated, but which have in accordance with the invention a combination of desirable and unexpected properties.

Various known processes have numerous shortcomings and do not yield satisfactory products. In another attempt to minimize the adverse effects of heat drying, a known process provides for means for cooling particles which have been dried to exposure to hot air by subjecting the dried particles to cooler air in a lower zone to which the particles fall. However, even in such a process, the irreversible adverse effect of the hot air drying the particles has already taken place.

It has been established as a rule that for heat-sensitive materials of all types (and for many foodstuffs heat sensitiveness commences at a temperature as low as 35° C.) the concept of countercurrent spray drying is unworkable and impractical. For reasons of equipment efficiency as well as for economic reasons, temperatures ranging from 100 to 160° C. must be employed, and therefore it is quite obvious that an incoming air at this temperature will destroy or completely burn the product in only fractions of seconds. Even when the drying air is fed at a temperature of 50° C. the air damages the dry powder since in all known countercurrent drying processes the dispersed droplets explode when contacting the low saturated drying gas and then shrink into a flattened skin which later on, during the course of the dehydration, agglomerates into the conventional type of particle having an exterior crust of skin and inner cavities closed to the exterior.

It is an object of the present invention to provide a process for dehydrating delicate natural products and delicate chemicals whereby much if not substantially all of the inherent characteristics of the original material will remain preserved in the dehydrated product.

Another object of the present invention is to provide a process for dehydrating delicate natural products, such as foodstuffs, without damaging or losing any appreciable amount of their desirable characteristics, such as flavor and aroma.

A further object of the present invention is to provide a process of concentrating and dehydrating emulsified edible fats and especially emulsified edible fats made from milk, cream, sweet and acid whey, vegetable fats emulsified with whole milk or skimmed milk or other materials, and the like and to produce preparations that are stable and can be stored without any substantial change in their properties for a prolonged period of time.

Another object of the present invention is to provide substantially anhydrous emulsified edible fats, and more particularly emulsified fats made from milk, cream, sweet and acid whey, vegetable fats emulsified with whole milk or skimmed milk or other materials, and the like, which dehydrated products are stable and can be stored for a prolonged period of time, whereby substantially all the inherent characteristics will remain in unchanged form in the dehydrated products.

Another object of the present invention is to provide stable, substantially dehydrated natural products and delicate chemicals or mixtures thereof which products are readily reconstituted by the addition of water to their original state without any appreciable change in flavor and aroma as well as other properties.

Other objects and advantages of the present invention will become readily apparent as the description thereof proceeds.

The novel dehydrated products of the invention have a combination of novel and unique advantageous characteristics. The dehydrated particles obtained by the dehydration process according to the present invention, when magnified, present a wrinkled and shriveled appearance which may be designated as "porcupine-like" or "hedgehog-like" appearance. The exposed surface areas of said particles are extensive in proportion to the surfaces of generally smooth surface particles of about the same diameter and are very considerably larger than the surface areas of particles obtained according to conventional spray drying. These are of a spheroidal form with vapor holes through the particle shell; they have a relatively smooth surface and body with a mass of fine and larger vapor holes through the particle shell and body.

In contrast, the particles of the products of the invention evidence a new type of a porous structure. The product comprises fully spherical granules with holes reaching deeply into the interior of the spheres. The particle does not evidence an outer skin, and it is free of an outer crust. Further, the particle is essentially free of cavities, or holes, that are closed to the exterior. As a result, the particles are free of air traps, or of such traps for other gases. The holes or crevices of openings of the particles are open to the exterior and thus connected with the exterior surfaces of the particles. The powder of particles of the invention has all the properties of the solid contained in the starting material which may be an aqueous dispersion, suspension or solution of solids. The powder is not denatured and, in the case of food products, it shows no change of taste as a result of the process of the invention.

The products of the invention have remarkably improved storeability, in particular when they are packed under vacuum. The gases which normally influence the stability of the powder products can thereby be completely extracted from the particles of the powder. Moreover, the powders of the invention may be considered as "instant" powder or product because the powder will essentially instantly dissolve without leaving any significant residue, even in cold water. If the powder is of a colloidal soluble material, or, if it is a non-soluble material but dispersible it is instantly dispersed or wetted while swelling. The dehydrated products according to the present invention are especially rapidly reconstitutable with water, i.e., their "instant" character is superior to that of products as they are obtained by conventional spray drying. For instance, whole milk powder is readily dispersed in water within one second to 10 seconds while commercial whole milk powder requires at least 2 minutes to achieve complete dispersion. The rapid dispersibility of the new products is apparently due to their considerably larger porous structure, the stability of the α-lactose (minimum conversion to β-lactose) and the non-denaturation of the protein. The whole powder is 100% soluble. The difference in structure and appearance under the microscope of dehydrated particles obtained according to the present invention in comparision to particles dehydrated by the conventional spray drying process, apparently results from the difference in the drying process and is evidence of the careful, slow water evaporation which, as described above, did not destroy the cohesive and adhesive forces so that the flavoring and aromatic constituents were retained.

In order to attain the desired objects, the dehydration process of the invention is carried out under certain specified conditions.

It has now been discovered that in order to obtain the desired structure in the dehydrated product it is necessary that the treatment of the material, during the first part of the dehydration, be extended or continued beyond the time necessary for dehydrating the product to the desired degree of water content until there is formed a corn or grain from the dispersed droplets. It is an important aspect of the invention that the residence time of the material to be dehydrated in the drying zone, under the conditions further described below, exceeds the time necessary for obtaining a product of the desired residual humidity. Thus the contact time of the material to be dehydrated with the specified conditions exceeds that required for the degree of dehumidification. Moreover, in accordance with the process, it is necessary that in the first zone of the dehydration, there be maintained an atmosphere of such high humidity that the dispersed droplets do not, as it is customary, explode during the dehydration and then shrink into a flattened skin which later on, during the course of the dehydration, agglomerates into the conventional type of particle having an exterior crust of skin and inner cavities closed to the exterior. In the first stage of the dehydration process, the dispersed droplets are subjected to such a limited dehydration in an atmosphere of highly humid gases of relatively low temperatures that the droplets of the material being treated forms itself without exploding into a porous corn, free of crusty skin. Moreover, in accordance with the process, in this first stage, the volatile substances that may have been extracted into the drying gas from a preceding particle that was dried are then in turn extracted, transferred or washed out from the humid atmosphere into another particle to be dried.

Accordingly, for these two reasons the contact time, or treatment period of the products with the moving countercurrent dehydrating gas, must be prolonged beyond the time necessary for the drying of the products to the extent desired. In this manner, in the upper stage of the drying zone, in the area of the highly saturated humid gases, the product of new structure can be formed and, as a second reason, ot provide a so-called washing zone in which the volatile materials which have been extracted from the materials in the lower zone are again absorbed in the materials. Thus, there prevail two main zones; an upper zone, the absorption zone and a lower zone, the adsorption zone. In order to form these effective zones, it is necessary to carry out the process of the invention with a slowly moving countercurrent of drying gas in a drying zone, or tower, of certain unusual height under the conditions specified.

It is an important aspect of the process that a certain relationship be maintained between the material to be treated and the drying gas, its humidity when fed into the drying zone, that at point of exit and its upward velocity in the zone. In accordance with the process of the invention the liquid starting material is dispersed into a countercurrent of gas, in determinable droplet size, at an inlet feed velocity in such a way that, preferably, the diameter of the drying tower is essentially constantly covered with a dense layer of the dispersed starting material. Accordingly, the starting material is sprayed into the tower in such a way as to form a dense screen of falling particles. In this manner, the escape of dust from dried material is substantially eliminated and the humidity-saturated air is brought into intimate contact with the dense rain of drops which reabsorbs vapors and aroma carried in the updraft of air. Accordingly, there prevails within the tower a column of falling drops initially falling in a dense rain into the entire area immediately below the spray device, their distribution becoming increasingly heterogeneous as the drops encounter the moving current of air or gas, and decreasing in weight as the evaporation progresses. The gradual and progressive decrease in weight is another characteristic of the process of the invention. It promotes the retention of the integrity (physical and biochemical) of the product. It is another aspect of the process of the invention that a pre-dried, gas-forming drying material which has a low humidity is fed into the bottom of the tower. The drying gas has a low degree of humidity and is of moderate low temperatures; it has a regulatable inlet feeding velocity. In this manner, the drop height of the material treated, and thereby the height of the tower, can so be determined and related to the upwardly moving velocity of the drying gas. Thus, the material and the gas are maintained in contact until, at the top portion of the tower, the exiting gas has a humidity between about 65% and 95% of saturation. Under such conditions, the material reaches the bottom of the tower already in a corn-like form, in which it is then removed from the tower.

The spraying device or nozzle system for forming the droplets is preferably mounted in the tower at some distance from its top. A distance of 2 meters to 10 meters is preferably selected. Numerous tests have shown that a distance of 3 meters to 5 meters from the top of the tower is particularly advantageous in a tower of the diameter and height used in the process. By having the spray nozzles below the top of the tower, space is provided above the nozzles for the air that does not contact the product to mix with the moist air so that the drops initially contact only moist air. The velocity with which the droplets leave the nozzles is between about 0.1 m./second and about 3.0 m./second and preferably lower than 2 m./second. Beyond the practical aspect, the initial low velocity with which the droplet is fed into the highly humid atmosphere contributes to minimizing the development of electrical charges on the droplet and its deleterious effects on the product.

Feeding of the material into the tower is performed with such means adopted to disperse the material to be dried into a substantially similar droplet size. There can be used, for instance, dual-material delivery nozzles or cup-like sprays. However, any nozzles that produce a rain of drops or droplets of a generally uniform average selected size with low friction may be employed. Fundamentally, the process of the invention is independent of the droplet size of the material to be dried. However, it is highly desirable for each particular material to select an optimum drop size within certain determined limits and ranges. Advisably, the drop sizes for various materials are selected so that they are delivered in the sizes as shown in the table. However, it has been found in accordance with the invention that it is highly desirable that the lower limits of the drop size be maintained at about 50 microns since at sizes below that there occurs a denaturization of the material as a result of the electrostatic charges which adversely affect the nature and the quality of the product. As a rule, the particle size should not be below 200 microns. It is only in a few exceptional cases like butter or margarine that it may or should be lower. To promote instant solubility, particle size should normally not be below 400 to 500 microns. Particle sizes up to 2000 microns are possible. The particle size of the droplets as given hereinbefore in microns indicates the average diameter size of the droplets. In general, about sixty to seventy percent of all droplets have a particle size within the range given in the table while about 15% to 20% consist of droplets of a smaller particle size and about 15% to 20% of larger droplets.

In this context it must be emphasized that in accordance with the invention the fracturing of the droplets is minimized. Most complete uniform distribution of the droplets within the drying tower, with the range of particle size of the droplets being as uniform as possible, is highly desirable.

The following table reports the average drop size in which typical materials are fed into the drying zone and treated in accordance with the invention.

TABLE

| Material treated: | Average drop size in microns |
|---|---|
| Condensed milk with 35% milk constituents | 500–600 |
| Drinking chocolate | 200–300 |
| Grape juice | 500–700 |
| Pineapple juice | 400–500 |
| Apple sauce | 500–700 |
| Banana puree with 20% solid constituents | 400–600 |
| Potato puree with 18% solid constituents | 300–600 |
| Tomato puree with 28% solid constituents | 600–800 |
| Oxtail soup | 700–900 |
| Vegetable soup | 500–600 |
| Pineapple jam | 600–700 |
| Strawberry jam | 600–700 |
| Apple jelly | 300–500 |
| Chocolate pudding | 300–500 |
| Egg | 400–600 |
| Coffee | 400–500 |
| Tea | 300–400 |
| Fish puree with 16% solid constituents | 800–1200 |
| Meat extract with 55% solid constituents | 400–500 |
| 20% sodium alginate solution | 150–250 |
| Yeast with 22% solid constituents | 600–700 |
| Blood plasma | 300–500 |
| Margarine | 200–300 |

The drying gas which is used in accordance with the invention is brought and maintained by pre-treatment, a pre-drying, at a humidity not exceeding about 10% preferably about 8%. When the temperature of the inlet gases is maintained at about 35° C., the relative humidty of the dehumidified gas is at about 3% to 4%.

Consequently, the stream of gas is substantially pre-dehumidified, for example, by freezing out the moisture or passing the gas over substances which remove the moisture content in the gas. Such dehumidifying materials include, for example, alumina gel, silica gel, dry calcium sulfate, dry magnesium sulfate, and the like. The process of the invention provides and allows for a treating temperature in the drying tower which is commensurate with the temperature at which the material was exposed in nature so that the drying material need not be exposed to a temperature in the drying tower which exceeds that at which the material is sensitive. The inlet feed temperature at which such materials may be introduced into the drying tower can reach up to about 60° C. for such heat-sensitive materials. The material is subtsantially immediately cooled upon being fed into the drying tower. For materials which are less heat-sensitive a treating temperature in the tower up to about 60° C. is suitable. The process of the invention may also be carried out up to about a temperature of about 80° C. since the temperature of the material itself is substantially below the temperature of the drying gas, particularly when the material is still damp, and particularly when the material is to be dried to a residual humidity of about 10 to 15%. The product will ordinarily contain 1% to 15% residual moisture. If desired, the material may then be subjected to a post-drying treatment. For most materials a preferred range of the temperature of the drying gas is between about 5° C. and about 35° C. For fat-containing milk products that are especially heat-sensitive, it is advisable to operate at temperatures between 0° C. and 18° C. For these products temperatures exceeding 30° C. should preferably not be employed.

The contact period between the drying gas and the droplets must be correspondingly long. It is, therefore, a further characteristic feature of the present invention to operate in countercurrent fashion and to provide rather relatively prolonged contact periods of gas and products. In other words, the stream of drying gas travels at relatively low velocities against the oppositely moving material for relatively long distances.

During the dehydration the water is evaporated mainly from the surface of the material being dried rather than from its interior. Moreover, dehydration proceeds gradually. With droplet sizes between about 100 microns and about 1500 microns, the average contact period between dehydrating gas and droplets is between about 5 seconds and 1000 seconds, in contrast to a fraction of a second used in conventional spray drying.

The velocity of the gas stream in accordance with the present invention is preferably between 0.05 meter/second and about 0.3 meter/second, but may range between 0.01 meter and 1 meter in a tower of a height as here involved where a total contact time of the order above indicated is obtained. The speed of the air and the height of the fall are both relative and correlated by the increase in humidity of rising column of air to the high degree specified. Thus, with a relatively short tower, the air velocity is increased in order to float the falling material longer so that the air achieves the degree of humidity specified—this in contrast to a higher tower were the time of fall is longer and a lesser upward velocity is required. The low velocity of the upwardly moving gas together with the presense of a zone of high humidity results in that in the upper half of the tower there is essentially no dust of the treated material. The effluent gases are essentially aroma-free even in the case of very aromatic products.

The particle size and the speed of the pre-dried gas current can be adjusted in accordance with the desired purpose in such a manner that an advantageous dehydrating time is achieved, for instance, a dehydrating time between 10 seconds and 120 seconds.

The gradual diminution of the humidity content of the air and gas stream, from an almost completely saturated state at the top of the tower, to a nearly completely dry state at the bottom of the tower where the air is introduced, permits a perfectly directed, regulated and slow evaporation. Thus, in accordance with the process of the invention, dehydration of the substance is initiated gradually at the top of the tower where the substance is in the liquid phase and water elimination is infinitely easier than later in the process when the substance is in the concentrated or solid phases. In the latter phase of the present process, even with the extremely dry air which is fed into the bottom of the tower, there is no danger of fast evaporation since the water elimination from the particle tends to become more and more difficult as its water content decreases. (This is in accordance with the well-known "Trockenschwanz" phenomena.) On the other hand, in the top of the tower where water may be eliminated very easily, the relatively high saturation of the air in proportion to the overall physical conditions of the substance prevents and minimizes an excessively fast elimination of water.

The long, controlled, directed evaporation of the process of the invention is one of the main points of the process. It minimizes any sudden change of climate in any increment of vertical travel of the droplets. This is possible due to the special height of the tower with a potential humidity scale calculated in proportion to the height of the tower.

In order to achieve a high humidity saturated atmosphere in the upper portion of the drying tower it is highly desirable that the tower height be maintained at a minimum of about 40 to 50 meters. The height of the tower is preferably considerably higher, for instance, between 50 and 200 meters, to avoid any sudden change of climate in any increment of vertical travel of the droplets.

In general, air is used as the drying medium unless the material is sensitive to oxygen, in which case an inert gas, such as carbon dioxide or nitrogen, may be used.

According to a further important feature of the present invention the countercurrent stream of air or other drying gas is maintained in contact with the product until it approaches a high degree of humidity, about 65%, and preferably between 75% and 95% of saturation at the level of introduction of the droplets within the tower. These conditions are secured in a tower of adequate height, with the liquid being dispersed into drops near the top, and dry air or gas entering at the bottom. The height of the tower, the upward velocity of the drying gas, and the size of the drops are such that when the air or gas reaches the level in the tower where the drops are entering, it will be highly humid, that is, above 65% relative humidity. With this combination of conditions there is a minimum of evaporation at the level where the drops enter the countercurrent stream of air or drying gas; no temperature conducive to the release of low volatile aromatics and flavor from the substance is encountered, and there is no heat to damage the product. On the contrary, the liquid droplets will reabsorb from the highly humid atmosphere aromas and flavor that may have been yielded to the gas in the lower portion of the tower and also absorb dried dust-like particles of the product that may have been carried up with the rising column of gas. These two zones and their respective functions as described are an important feature of the process. The air or gas is withdrawn above the level at which the liquid enters the tower.

During the process, as the drops move downwardly against the rising column of gas they progressivly encounter drier and drier air or gas and evaporation takes place progressively and gradually. Evaporation may be continued until only solids remain, or it may be effected only to the extent necessary to produce a product of a slurry or paste-like character or a thick viscous concentrate, depending, of course, upon the material being treated and the product to be formed. The dried product will ordinarily contain from 1 to 15% of mositure.

The product obtained in the process is collected at the bottom of the tower which may be flat or funnel-shaped. In another embodiment, the bottom of the tower consists of an intermediate flat bottom, which is inserted at a distance of about 0.5 meter to 0.6 meter from the actual bottom of the tower, through which the air can flow upwardly while the dehydrated product is retained on the intermediate bottom and is removed from the tower by means of customary devices, such as scrapers and a screw conveyor. The intermediate bottom may consist of a ceramic mass, for example of porous plates. It may also take the form of a filter material deposited upon such plates, or a freely suspended filter cloth under tension which is supported by a metal mesh or a net. Below the intermediate bottom a gas pressure chamber may be provided, so that the gas can be forced through the intermediate bottom under pressure. Thus, the collection means of the tower used for the process is adapted to suit best the particular operating conditions and the product obtained.

The invention is further illustrated by the accompanying drawing, FIG. 1 of which is a sectional elevation view of a drying zone in which the invention may be carried out. In FIG. 1 there is shown a drying tower 1 with a false bottom 2 which is a horizontal porous, sieve-like support. The false bottom 2 defines a space 3 with the tower bottom and an inlet pipe 4 supplies a gaseous drying medium to the tower. The liquid material to be dried in the tower is introduced therein through supply conduit 5 leading to a material distribution system 6 having a plurality of inlets for producing a dense curtain of droplets over almost the entire horizontal cross section of the tower. The used drying medium, or gas, which carries the water from the liquid material dried in the tower, is led into the atmosphere through flue 7 or it may be recovered through gas outlets 8 and 7 leading to a gas dehumidifying plant. The drying medium may be returned to the drying tower in a closed cycle after it has been dehumidified.

The granular powder is collected on the false bottom until it has reached a desired layer thickness and after it has reached a predetermined degree of dehydration, a scraper 9, which is rotatable about the axis of the tower, is turned to push the dried material through a radial slot arranged in the false bottom above screw conveyor 10. The screw conveyor is mounted in a housing which has an upper opening facing the radial slot so that the dried material can fall through the slot into the housing and be transported out of the housing and the tower by the screw conveyor directly into a vacuum packing device 11 without contacting the atmosphere. If the scraper 9 has brushes for pushing the dried material it may be useful intermittently to blow a dried gas through inlet pipes 12 and 13 to remove material adhering to the brush bristles.

Figure 2:
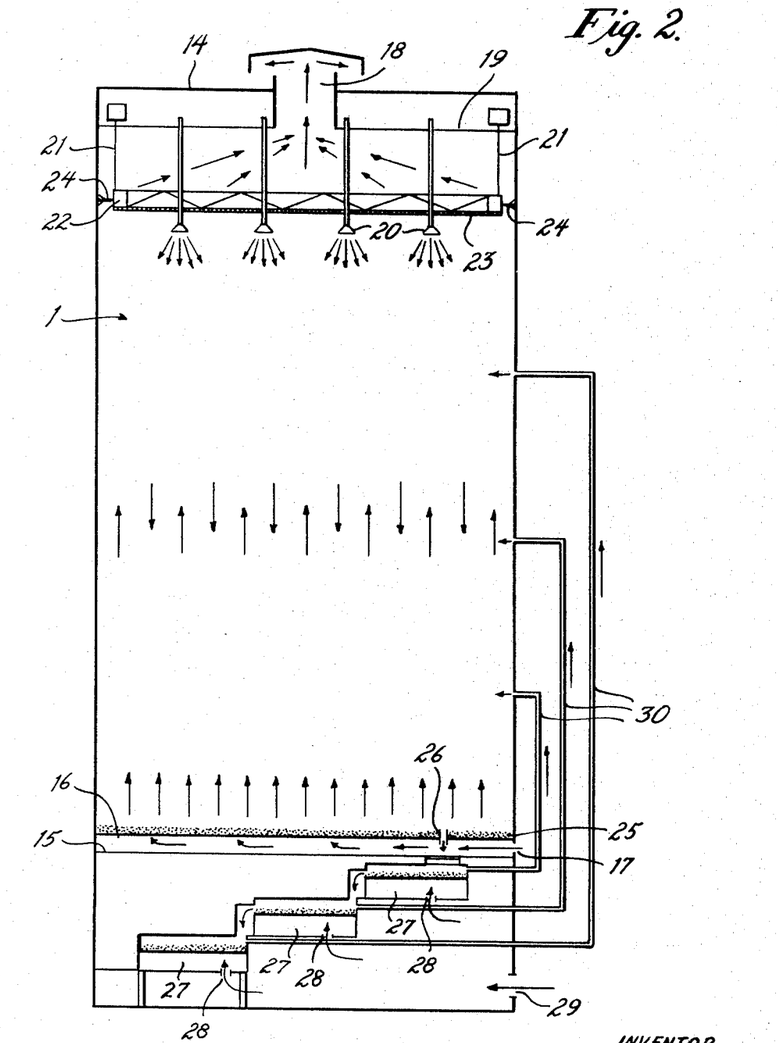

FIG. 2 shows another sectional elevation view of another embodiment of the drying tower 1, with a top 14 and a bottom 15 with a porous intermediate bottom 16 disposed at a space above bottom 15. The inlet opening 17 provides fresh gas into the interspace between the drying bottom and the porous intermediate bottom 16. The air outlet 18 is directed through the top 14 and another intermediate top 19 spaced apart from said top. This intermediate top 19 carries the material-distributor devices 20 and also side walls 21 by means of which, for instance, a frame 22 which may be welded together from steel pipes is adjustable down to the porous intermediate bottom 16 in the drier. Thus, the height of the effective drying zone in adjustable relative to the other variables of the process such as velocity of the rising gas. Frame 22 is covered with a filter 23 and is adapted outside with brushes 24 to brush the tower walls. Through the covered porous intermediate bottom 16 on which the layer of material 25 is accumulated, an overflow pipe 26 which is height-adjustable, is projected through which the powder can trickle into fluidized beds after-driers 27 which are arranged in stepwise series upon another. Into these after-driers, fresh drying gas can be introduced through inlet 29 into the space below the driers through the bottom inlets 28, in adjustable amounts. The exhaust gas of the after-drier can then be fed back to the tower through the pipes 30 disposed in variable heights through the tower wall. Traces of dried material carried off with exhaust gas from the tower may thus be recovered, and the moist air has the further opportunity to yield any aromatic and flavor substances or volatiles to the liquid.

Figure 1:
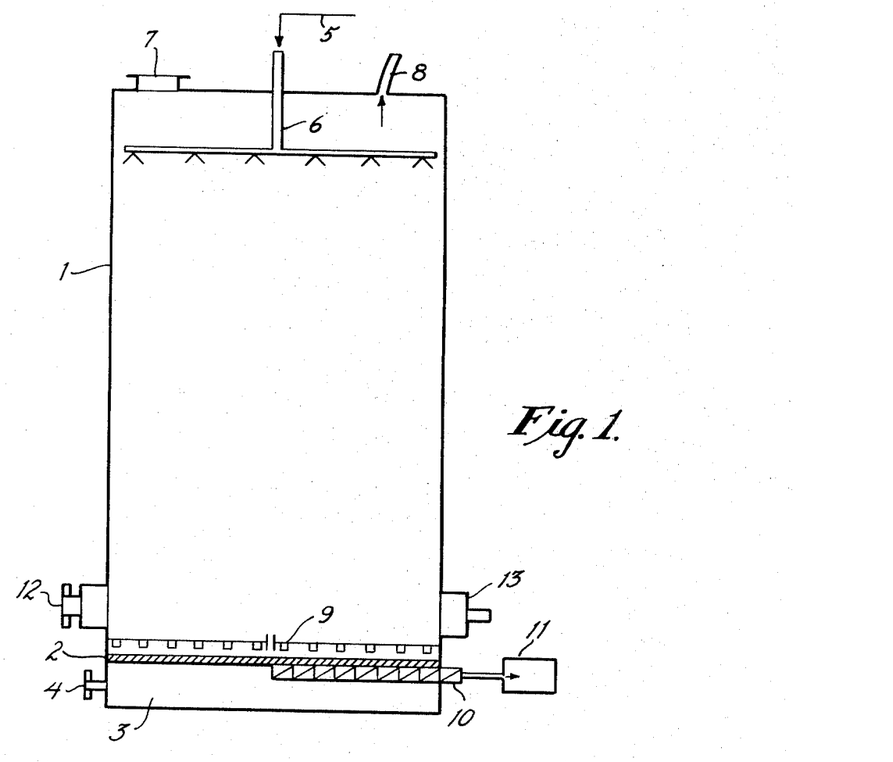
Figure 3:
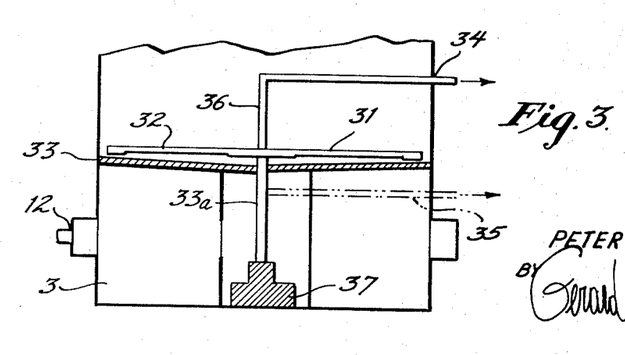

FIG. 3 shows a modified bottom in a drying tower of the type shown in FIGS. 1 and 2. In this embodiment, the dried material is not removed from the false bottom by a mechanical scraper but by a pipe 31 acting as pneumatic conveyor. The pneumatic conveyor comprises a radially extending pipe 32 arranged for rotation about the axis of the tower to sweep over false bottom 33 with a suction slot facing the false bottom. The radially extending pipe 31 is in communication with an axially extending tube 33a whose output is connected to the interior of a container which is under sub-atmospheric pressure, by means of conduits 34 or 35. The tube 36 is rotated through a gear train 37 by a power source (not shown) and suitable gaskets are arranged at all joints between movable and fixed parts, as will be obvious to the skilled in the art without further explanation or illustration. If desired, the mechanical and pneumatic conveyors shown in FIGS. 1 and 3 may be so combined that the mechanical scraper pushes the dried material towards the circumference of the tower while the pneumatic conveyor has suction slots only at the outer end or ends of the radial pipe 32 to pick up the powder at the tower circumference and transport it pneumatically to the packing station.

Figure 4:
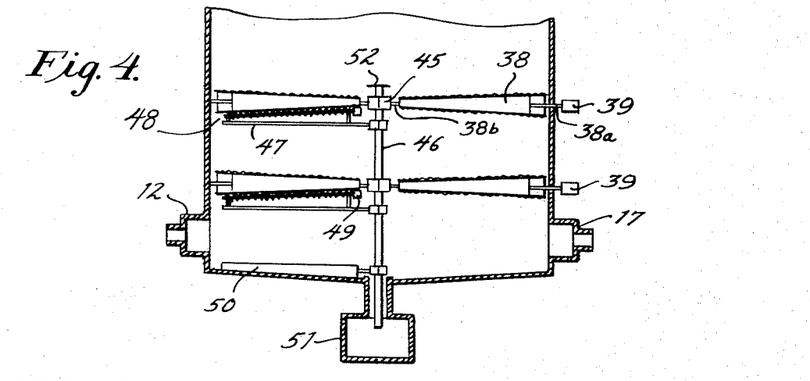
Figure 5:
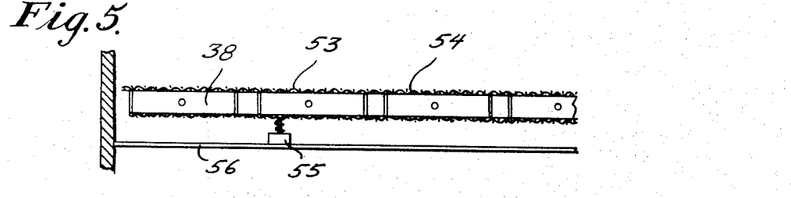
Figures 6, 7:
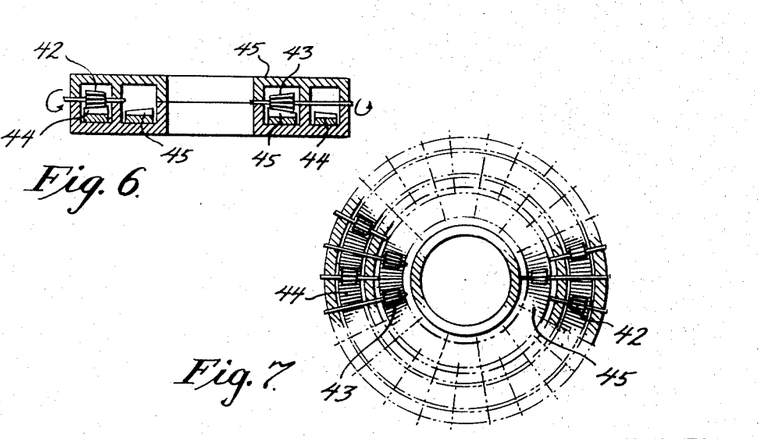

FIG. 4 shows another embodiment of a drying tower bottom. In this embodiment two spaced and superposed sieve-like false bottoms are arranged in the tower. Each of the false bottoms is constituted by a plurality of sector-shaped sieve boxes 38. The boxes may be turned about their axes. As is shown in FIG. 5, the spacing between adjacent sieve boxes is sufficient to enable all boxes to be turned by 180° simultaneously, a single motor turning the gear rod which meshes with pinions on the individual bearing pins of the sieve boxes. The sieve boxes have bearing pins 38a and 38b at their respective ends and the bearing pins define an axis about which the boxes may be rotated. The bearing pins are supported in gear box 45 while pins 38a are journaled in the tower wall. The gear boxes 45 for each of the false bottoms are mounted on the support pipe 46 extending axially into the drying tower, and radially extending brush support rods 47 are mounted on the pipe and may be moved along the pipe to adjust the spacing of the brushes 48 in relation to the underside of the false bottoms. The brushes 48 are rotatable about their axes by motors 49 and sweep the undersides of the sieve boxes. In this manner, the dried spherical granules fall first on the upper false bottom, pass through its sieve boxes, are swept off their undersides, fall on the underlying false bottom, pass through the latter's sieve boxes, are swept off their undersides and drop to the bottom of the tower where they are swept by a rotating scraper or brush 50 into a central outlet opening through which the dried powder falls by gravity into packing station 51 without contacting the atmosphere. The dehumidified drying gas may be introduced into the bottom of the drying tower through pipe 46 and a baffle plate 52 may be mounted over the outlet of the pipe to distribute the drying gas over the entire cross section of the tower so that it will rise from the bottom in a column. The introduction of drying gas is preferably initiated only shortly after the sieve boxes have been turned so that the fine-mesh sheet 53 is fully dried before another layer of dried material is formed thereon. As shown in FIGS. 5 and 6, the sieve boxes 38 are bounded by two generally horizontally extending perforated or sieve-like walls 53 and one of these walls has placed thereover a fine-mesh web 54. The sieve boxes may be turned about their axes in a manner shown in FIGS. 5 and 7. The bearing pins 38a of two sieve boxes of each false bottom project outwardly from the tower wall and carry motors 39 enabling the boxes to be turned by 180°. The inner pins 38b of adjacent boxes project alternatively into an inner and an outer annular chamber in gear box 45 and carry respective pinions 42 and 43 meshing respectively with annular gears 44 and 45 which are rotatable about the axially extending support pipe 46. In this manner, adjacent sieve boxes are rotated about their axes sequentially one after the other. This prevents interference of neighboring sieve boxes with each other during rotation and makes it possible to space adjacent boxes more closely together so that the interspaces may be fully covered by the sieve sheets if the latter extend only a little laterally beyond the boxes, as indicated in broken lines in FIG. 4. When a motor 30 turns one sieve box, the respective pinion 42 or 43 on the inner bearing pin of the box is simultaneously rotated and moves forward the rotational mounted annular gear 44 or 45 for a given distance. This rotational movement, in turn, causes rotation of the adjacent pinions 42 and 43 so that the alternate sieve boxes are sequentially turned by 180°.

When the drying tower is of a circumferential cross section, as shown in FIG. 4, the sieve boxes are sectionally divided. When the drying tower is of a horizontally rectangular cross section, the perforated bottoms are made of rectangular sieve boxes arranged adjacently to each other, as shown in FIG. 5. Beneath the sieve boxes there can be disposed brushes 55 which are movable on a rail 56 and which serve for brushing the under surfaces of the sieve boxes.

The following examples serve to illustrate the present invention without, however, limiting the same thereto.

Example 1

There were transformed 1100 kg. of orange juice into a powder having a residual moisture content of 12%. Preliminary experiment had indicated that droplets of 500 microns were most advantageous. The orange juice was divided into such droplets with the aid of pressure nozzles arranged below the top of the drying tower. Three large size nozzles each having a capacity of 365 kg. per hour were used, the combination being capable of handling 1100 kg. per hour. In place of three large nozzles, eleven smaller nozzles, each of 100 kg. per hour capacity could have been used. The most effective dehydrating period was determined to be 70 seconds in a tower 50 meters high with a rate of descent of 0.65 meter per second, and with the nozzles 4.5 meters from the top of the tower. Because of its high fructose and glucose sugar content, orange juice is very hygroscopic. The temperature of the drying air entering the tower was 20° C. The air leaving the top of the tower contained 10% of water per cubic meter, this being close to 85% saturation taking into consideration the temperature drop caused by evaporation. For evaporating about 1000 kg. of water from 1100 kg. of orange juice, a total of 100,000 cubic meters of air were required.

The cross-sectional area of the tower was about 195 sq. meters, and its diameter was 15.75 meters. The drying air was introduced tangentially at the bottom of the tower with the aid of fans through a circular feed line. The tangential air feed slits had a total discharge area of 30 sq. meters to 60 sq. meters. In this manner about 115 kg. of dehydrated orange juice having a moisture content of about 7% were recovered at the bottom of the tower, using a revolving scraper and screw conveyor.

Example 2

There are treated 1000 kg. of cream of a fat content of 55% yielding fine droplets of a particle size of about 200 microns with the aid of pressure nozzles. Three large size pressure nozzles, each having a capacity of 335 kg. per hour, are used. The rate of descent of the droplets of sprayed cream is about 0.65 meter per second. Thus, the droplets are in contact with the dehydrating air current for about 70 seconds in a dehydrating tower of a height of 50 meters. The temperature of the dehydrating air current is about 15° C. Before entering the dehydrating tower, the air is carefully dried. The pre-dried air is introduced into and conducted in the tower in countercurrent direction to the cream droplets. Dehydrated cream is collected at the bottom of the tower in powder form. On kneading and intimately mixing the powder with about 10% of water and allowing the mixture to stand for a few minutes, a spreadable butter like cream is obtained which fully corresponds in its consistency, odor, and taste to ordinary. The powder can be stored without refrigeration for at least several months without becoming rancid.

In place of the concentrated cream, there can also be used cream of a lower fat content, for instance, of a fat content of 18%. This starting material yields a dehydrated cream powder which can readily be reconstituted by means of water to cream of the original fat content and which can be stored for several months without damage.

Example 3

The procedure is about the same as described in Example 1 whereby, however, pasteurized whole milk is dehydrated in place of orange juice. The droplet size range is between about 500 microns and about 700 microns. The outflow speed of the milk from the nozzles is about 3 meters per second. The average speed of descent of the droplets is about 0.70 meter per second. The temperature of the pre-dried air introduced into the bottom of the tower is about 24° C. The air leaving the top of the tower has a moisture content of about 85% relative humidity and a temperature of about 14° C. For evaporating about 1000 kg. of water from about 1100 kg. of whole milk per hour, a total of about 100,000 cubic meters of air are required. The resulting milk powder of a water content of about 3% is readily soluble and reconstitutable in water and the reconstituted milk has substantially the same aroma and flavor as the starting milk.

Other dehydrated materials can be obtained by dividing the materials described in the Table, above, into droplets of the average particle size range stated, and subjecting the droplets to a dehydration in which the rate of descent varies between about 0.40 meter per second and about one meter per second. The temperature of the drying gas introduced into the drying tower is between about 22° C. and about 28° C. The air volume to evaporate about 1000 kg. of water from the materials to be dried is about the same as that used in Example 1.

There are fed 1100 kg. of a solution of gelatin coming from extraction (8% solids) at the top of the tower in a droplet size of 300 microns and in the form of a dense screen. The velocity of descent is approximately 1.4 m. per second. Air requirements are approximately 100,000 m.³. At an entrance temperature of 24° C., approximately 95 kg. will arrive at the bottom of the tower with a residual moisture content of 8%. The exit temperature of the gas stream at the top of the tower is about 14° C. due to the evaporation.

The air saturation is 85%. The product obtained is a fine, porous grain dissolving five times faster in water than sheet gelatine or pulverized gelatine. Moreover, the solubility rate of this gelatine is 5% higher than that of gelatine produced with the vacuum evaporator and normal drying. Also, it has a 20% higher gelling power and a solubility rate ten times faster than the gelatine produced by spray drying.

The process according to this invention is applicable to liquid-carrying solids, in solution or suspension, especially organic materials. It is also suitable for the preparation of stable preparations of edible fats, especially of butter, milk fat, and margarine and other lacteal products. Thus, it is possible to convert milk, cream, or whey, regardless of whether sweet whey or acid whey is employed, and if desired, with the addition of bacterial cultures, water, and sodium chloride, into a condition wherein the edible product can be stored for a prolonged period of time and, if made from a milk substance containing sufficient fat, it will produce a kneadable product which may be used as a spread for bread.

The new process is applicable to cream of a fat content, for instance, between 40% and 60%. Such a concentrated cream has a low milk sugar content which does not affect the taste of the resulting cream. Of course, when washing and centrifuging cream with water prior to dehydration, its milk sugar content can also be considerably reduced. The resulting cream has a fat content between 82% and 87% and a total dry content of 97% to 99% and as a maximum, of 99.5%. Such a dehydrated cream, after reconstitution with about 10% to 12% of water, has a fat content which is only slightly or not at all lower than the butter fat content of ordinary butter which is between 80% and 82%.

Such a butter-like cream has the very important advantage that a large proportion of the mineral salts and of other milk constituents which ordinarily are removed together with the buttermilk and which comprise about 3.5% of milk proteins, 0.7% of mineral substances, and 4% of milk sugar, remain in the cream. This is of considerable nutritional value. In addition thereto the process according to the present invention has the economical advantage that substantially no fatty material is lost. Heretofore, about 0.2% to 0.5% of fat were lost in the buttermilk. It is evident that this process eliminates completely the problem of finding a proper use for buttermilk. Dehydrated butter powder and butter fats dehydrated according to the present invention have the further advantage that they do not sputter on heating.

As mentioned above, the milk sugar may be eliminated before dehydration by adding to the cream to be dehydrated, which contains for instance 30–60% of fat, four times to ten times its amount of distilled or tap water, intimately mixing the cream therewith, and centrifuging the resulting dilute cream at room temperature or at elevated temperature. This washing process may be repeated for a second time, if desired. When completely washing out the milk sugar, the resulting dehydrated product represents a butter-like mass. When washing cream, various types of butter-like products can be obtained in dehydrated form. All these butter-like preparations can readily be reconstituted to butter by mixing and kneading with 15–20% of water.

Cooked products such as mashed potatoes, purees of cooked vegetables or fruits, jams or jellies or infusions, such as coffee are preferably cooled before being dehydrated so that their temperature is close to the temperature of the humid evaporating medium, air or gas, into which they are introduced so as to avoid the release of substantial heat in the upper portion of the tower and a corresponding decrease in the relative humidity of the atmosphere at this level. On the other hand, if the product were cooler than the atmosphere in which drops were formed, condensation of moisture in this area, unlike conventional processes where a cold product is introduced into a heater gas, is not detrimental since it may favor the absorption from the gas of volatiles released at lower levels and is compatible with the gradual drying of the drops below the level of its formation.

The advantageous properties of the products of the invention are ilustrated by tests and analyses which have shown, for instance, that the total acidity of dehydrated citrus fruit juices, and their vitamin A and vitamin C content are not appreciably reduced by dehydration. In dehydrated tomato powder the acidity and vitamin C as well as the pigments Lycopene and Carotene (pro-vitamin A) were not substantially affected. Dehydrated mashed potatoes with 30% of milk showed under the miroscope the characteristic unchanged potato starch grains. The proteins, fats, and carbohydrates present therein were substantially unchanged. Dehydrated milk powder according to the present invention contains the α-lactose in unchanged form while in conventional spray drying the α-lactose is converted into β-lactose. The egg albumin, phosphatides (lecithin), fats, and pro-vitamin A in dehydrated egg powder obtained according to the present invention were not affected by the dehydration process. Dehydrated yeast contained the same amount of vitamin B$_1$ as the starting yeast. The process is applicable to heat-sensitive pharmaceutical solutions or suspensions.

In order to promote a powder product with a constant homogeneous granular size, it is advisable to reintroduce the exhaust gases of the after-drying device which still contain dust particles of the material. It was found that the dust particles of the material melt together with the droplets or particles falling down from the top, if introduction takes place in an appropriate tower altitude, preferably in the region between the lower and the upper quarter between the bottom of the lower and the spraying device.

If several after-drying devices are used sequentially the exhaust gas of each after-drying device containing dust particles of the material is reintroduced to the tower through separate pipes and if necessary at different tower altitudes. The after-drying devices may be arranged directly one upon another or laterally following one another.

Of course, it will readily be apparent to those skilled in the art that the invention is not limited to the above described particular embodiments, and that various changes and modifications may be made without departing from the spirit of the invention or the scope of the appended claims.

I claim:

1. A process for dehydrating a heat-sensitive food material within a drying zone which comprises contacting a shower of droplets of the material having a size of not less than about 50 microns with a drying gas in a region of the drying zone where the drying gas has a relative humidity of at least about 65%, retarding initial evaporation of the droplets upon their contact with the gas, thereby maintaining the droplets in their unexploded condition, contacting the unexploded droplets with the drying gas as they fall countercurrently through the increasingly drier drying gas, gradually and progressively dehydrating the unexploded droplets from their surface inwardly, feeding upwardly in the drying zone an initially dehumidified, drying gas having a temperature not exceeding about 60° C., gradually increasing its humidity as it rises throughout the drying region by gradually absorbing water from the droplets, maintaining the upward feed of gas in contact with the droplets until it has a relative humidity of at least about 65%, and separating the dehydrated product.

2. A process for evaporating water from a heat-sensitive material within a drying zone which comprises contacting a shower of droplets of the material having an average size in the range of about 50 to 2000 micron with a drying gas in a region of the drying zone where the drying gas has a relative humidity of at least about 65% and a temperature not exceeding about 60° C., retarding initial evaporation of the droplets upon their contact with the gas, thereby maintaining the droplets in their unexploded condition, contacting the unexploded droplets with the drying gas as they fall countercurrently through the increasingly drier drying gas, gradually and progressively dehydrating from the surfaces inwardly, thereby creating crevices reaching within the inside of the shrinking particles, feeding upwardly in a drying zone a dehumidified, drying gas having an initial relative humidity not exceeding about 8% and a temperature not exceeding about 60° C., increasing its humidity by gradually absorbing water from the droplets while the gas rises throughout the drying region, maintaining the upward flow of gas in contact with the droplets until the relative humidity of the drying gas is raised to within the range of about 65% to about 95%, and separating a dried product having a residual moisture not exceeding about 15%.

3. In a process for evaporating water from a heat-sensitive material within a drying zone which comprises introducing a shower of droplets of the material having an average size in the range of about 50 to 2000 microns in a drying zone, the improvements which comprise contacting the shower with the drying gas in the zone where the drying gas has a relative humidity of at least about 65% and a temperature not exceeding about 60° C., retarding initial evaporation of the droplets upon their contact with the gas, contacting the droplets with the drying gas as they fall countercurrently through the increasingly drier drying gas, gradually and progressively dehydrating the droplets from their surfaces inwardly, feeding upwardly in a drying zone a dehumidified, drying gas having an initial relative humidity not exceeding about 8% and a temperature not exceeding about 60° C., and maintaining the upward flow of gas in contact with the droplets until the relative humidity of the drying gas is raised to within the range of about 65% to about 95% and for a period of time which exceeds that necessary to obtain a dehydrated product of a humidity of not more than 15% and until the product becomes a porous, outer-skin free shriveled particle having crevices throughout the body which are open to the exterior, and separating the product having a residual moisture not exceeding about 15%.

4. The process of claim 1 in which the velocity of the upward flow of gas is maintained in the range of about 0.01 meter to 1 meter per second, thereby providing adequate contact time between the dehydrating material and the drying gas to promote a slow gradual dehydration.

5. The process of claim 4 in which the rate of downward flow of the dehydrating material is maintained at a slow rate to provide a contact time of about 5 to 1000 seconds with the drying gas.

6. The process of claim 1 in which the velocity of the rising gas is 4 times lower than the velocity of the descending droplets.

7. The process of claim 1 in which aromatic and flavoring constituents of the dehydrating material which are extracted from the material are carried upwardly with drying gas and reabsorbed into the droplets in the initial high moisture region.

8. The process of claim 1 in which the relative humidity in the upper region ranges from 65% to about 95%.

9. The process of claim 1 in which the temperature in the drying zone does not exceed about 30° C.

10. The process of claim 2 in which the material treated is organic.

11. The process of claim 9 in which the material is a fatty lacteal material, a fruit or a vegetable product.

12. The process of claim 1 in which the average particle encounters no drastic difference in climate in any increment of descent.

13. In a process of producing a stable, substantially dehydrate, edible fat-containing lacteal product, the steps which comprise forming a dense screen of falling droplets of a liquid aqueous emulsion of an edible, fat-containing lacteal starting material in the upper part of a drying zone, said droplets having a droplet size between about 50 microns and about 2000 microns, passing a stream of a drying gas at a temperature not substantially exceeding 30° C. into the lower part of said drying zone and upwardly through said drying zone countercurrently relative to said descending droplets, the time of contact between said drying gas and said descending droplets being between about 5 seconds and about 1000 seconds, evaporating moisture and volatile aromatic and flavoring constituents from the surface of the droplets, thereby substantially saturating the ascending drying gas with said moisture, reabsorbing the aromatic and flavoring constituents in the initially formed screen of droplets from the relatively moisture-saturated drying gas, controlling the evaporation from the surface of the droplets by maintaining a slow rate of downward flow of the droplets whereby the degree of concentration and dehydration increases with their downward movement, removing the waste drying gas from the top of the drying zone, and removing the resulting dehydrated fat-containing lacteal product in a reconstitutable form having essentially its initial flavor content.

14. In a process of producing a stable, substantially dehydrated, edible fat-containing lacteal product, the steps which comprise forming a dense screen of falling droplets of a liquid aqueous emulsion of an edible, fat-containing lacteal starting material in the upper part of a drying zone, said droplets having a droplet size between about 50 microns and about 500 microns, passing a stream of a drying gas at a temperature between about 5° C. and about 25° C. into the lower part of said drying zone and upwardly through said drying zone countercurrently relative to said descending droplets, the time of contact between said drying gas and said descending droplets being between about 10 seconds and about 120 seconds, evaporating moisture and volatile aromatic and flavoring constituents from the surface of the droplets, thereby substantially saturating the ascending drying gas with said moisture, reabsorbing the aromatic and flavoring constituents in the initially formed screen of droplets from the relatively moisture saturated drying gas, controlling the evaporation from the surface of the droplets by maintaining a slow rate of downward flow of the droplets whereby the degree of concentration and dehydration increases with their downward movement, removing the waste drying gas from the top of the drying zone, and removing the resulting dehydrated fat-containing lacteal product in a reconstitutable form having essentially its initial flavor content.

15. The process of claim 14 in which the product treated is a milk cream product.

16. The method of dehydrating a liquid material containing heat-sensitive solids until the material has a water content up to 15% and may be reconstituted by the addition of water to a product of essentially the same flavor and aroma as the original liquid material, comprising the combination of steps of continuously introducing a dehumidified drying gas at the bottom of a drying tower at a temperature between 0° C. and 60° C., continuously forcing said gas out at the top of the tower to produce an upwardly rising column of gas in said tower, introducing said liquid material as a dense layer of droplets having a size between 50 and 2000 microns, into said rising column of gas countercurrently to the column and below the top of the tower, said droplets falling through the rising gas column for a distance of about 50 meters to 200 meters, controlling the gas velocity within the range of about 0.01 meter/sec. and 1 meter/sec. in relation to said distance so that the contact time between the droplets and the gas is sufficient to raise the saturation of the gas to 65% to 95% where the droplets are introduced whereby initial evaporation is negligible in the falling droplets, the saturation of the gas column decreasing gradually toward the bottom of the tower, and collecting and removing the dehydrated material at the bottom of the tower.

17. The process of claim 1 in which the residence time of the material to be dehydrated exceeds the time necessary for obtaining a product of the desired residual humidity.

18. The process of claim 1 in which the material is made to progress through an initial, upper adsorption zone and then through a second, lower absorption zone.

19. The process of claim 18 in which the material to be dehydrated is allowed to descend for a distance a minimum of about 40 meters.

References Cited

UNITED STATES PATENTS

| | | | |
|---|---|---|---|
| 103,602 | 5/1870 | Gray | 159—4 |
| 986,365 | 3/1911 | Corliss | 159—4 |
| 996,832 | 7/1911 | Campbell | 99—203 |
| 1,394,035 | 10/1921 | MacLachlan | 99—203 X |
| 1,732,454 | 10/1929 | Wurster | 159—4 |
| 2,835,597 | 5/1958 | Barzelay | 99—203 |
| 2,842,193 | 7/1958 | Ballestra | 159—4 |
| 2,887,390 | 5/1959 | Coulter et al. | 99—203 X |
| 2,953,457 | 9/1950 | Sanna | 99—203 X |
| 2,616,604 | 11/1952 | Folsom | 53—22 |
| 2,885,788 | 5/1959 | Levitan | 34—5 |

FOREIGN PATENTS

| | | |
|---|---|---|
| 16,851 | 6/1935 | Australia. |
| 4,473 | AD/1906 | Great Britain. |

OTHER REFERENCES

Industrial and Engineering Chemistry, December 1938, pp. 1372–1384, pp. 1372, 1373, and 1375 relied on.

MAURICE W. GREENSTEIN, *Primary Examiner.*

U.S. Cl. X.R.

99—210, 63, 71, 77, 203, 206, 207; 159—48, 4